L. B. GOODHUE.
FURNACE FOR MELTING GLASS.

No. 77,479. Patented May 5, 1868.

Witnesses:
Saml S. Boyd.
Henry T. Carter.

Inventor:
L. B. Goodhue

United States Patent Office.

LYMAN B. GOODHUE, OF ST. LOUIS, MISSOURI.

Letters Patent No. 77,479, dated May 5, 1868.

IMPROVED FURNACE FOR MELTING GLASS.

*The Schedule referred to in these Letters Patent and making part of the same.*

TO ALL WHOM IT MAY CONCERN:

Be it known that I, LYMAN B. GOODHUE, of the city and county of St. Louis, in the State of Missouri, have invented a new and useful Improved Glass-Furnace, of which the following is a full, clear, and exact description, reference being had to the drawing annexed, making a part of this specification, in which—

Similar letters indicate like parts.

My invention consists in constructing the pots and furnace used in manufacturing glass in such a manner as to economize the manufacture, by saving time, fuel, and pots.

Figure 1:
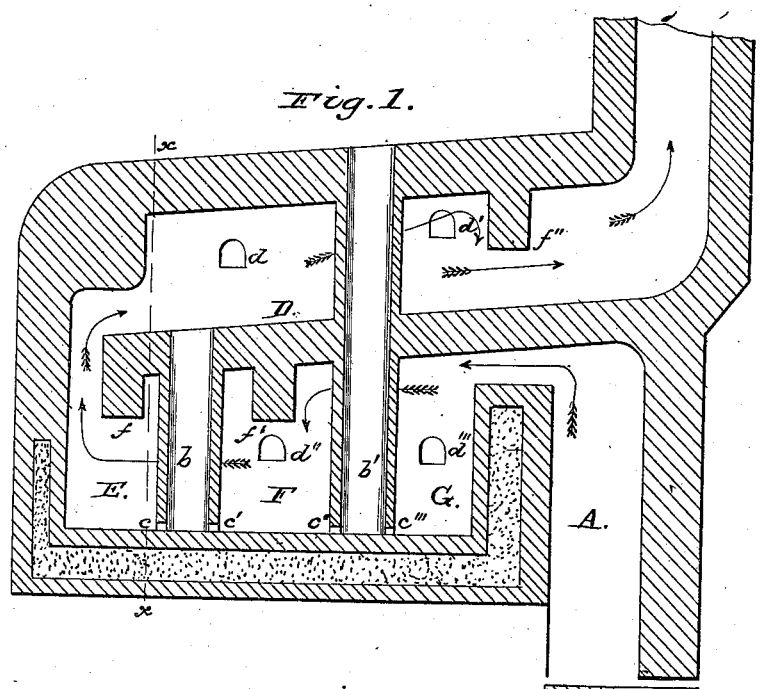
Figure 1 represents a sectional side elevation of my improved furnace.

In fig. 1, A represents the fire-box of my furnace; $b\,b'$, the pots, formed of fire-clay, which are built into and make a part of the furnace itself, as shown by the drawing. The larger pot, having an opening at the top of the furnace, is fed from the outside, while the smaller one is fed from the opening $d$, as well as by the partially-molten glass flowing from the inclining arch D, figs. 1 and 2. These pots, from their position in the oven, are powerfully acted upon by the heat, and, being provided with one or more outlets, shown at $c\,c'\,c''\,c'''$, will throw into the bottom of the vats E, F, and G, the glass, properly melted to be easily worked.

I do not intend, in manufacture, to limit myself to two pots, but shall use the number most convenient, and arrange them in the positions where they will best receive the heat.

The openings or ports $d\,d'\,d''\,d'''$ are used both for feeding the furnace and for removing its contents, when properly melted, by means of the pipes or tubes usually employed. Through the openings $d\,i''$ the shelf or arch D, figs. 1 and 2, is fed with the "batch," which, as it melts, will flow into the vat E, and pass thence into the vats F and G, the pots being so arranged as to allow free circulation both of the heat and molten glass around them on every side.

Figure 2:
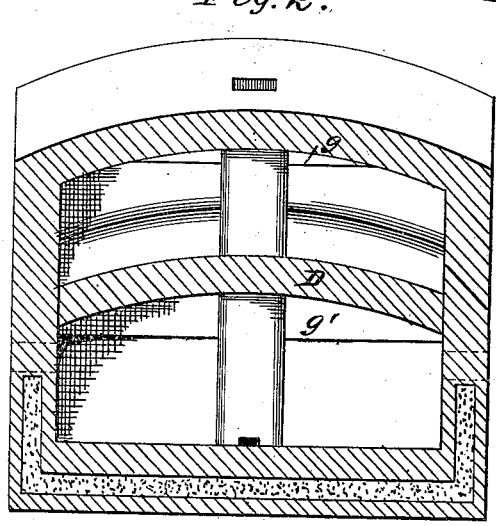
Figure 2 represents a transverse section of my invention at $x\,x'$.

I also construct my furnace with reverberatory arches at $f\,f'\,f''$, extending entirely across the furnace, as shown at $g\,g'$, fig. 2. The heat, taking the direction shown by the various arrows in fig. 1, is, by means of these arches, reverberated upon the glass, thus materially aiding in melting the same.

I do not intend to limit myself to arches constructed perfectly perpendicular, but may incline them as experience may dictate.

I also place a packing of sand under and around the bottom of the vats or furnace, as shown in the drawing, which, by its impermeability, will effectually prevent the escape of glass from the furnace, although the walls of same should crack and open. This lining is made when the furnace is constructed, being built into it.

The advantages of this construction of a glass-furnace are many and obvious. The pots are stronger, more durable, less liable to be broken or injured, and I do away with the annoyance and delay occasioned by the breaking of pots constructed in the old way. The heat coming more immediately in contact with the glass, and a greater surface of glass being exposed to its action, less fuel will be required, and the glass will be brought to a proper condition for working in less time than when the old furnace is used. The sand packing renders accidents from the escape of the glass almost impossible, which is not the case with other furnaces.

What I claim as my invention, and desire to secure by Letters Patent, is—

1. The shelf D of a furnace for melting glass, as shown and specified.
2. The combination of a furnace for melting glass with immovable pots, as specified.
3. The employment of reverberatory arches in a furnace for melting glass, arranged as specified.
4. The packing of a furnace for melting glass with sand, as specified.
5. A furnace for melting glass, when constructed substantially as shown and specified.

L. B. GOODHUE.

Witnesses:
SAM'L S. BOYD,
HENRY T. CARTER.